(12) United States Patent
Mamakos (10) Patent No.: US 7,693,176 B2
(45) Date of Patent: Apr. 6, 2010

(54) METHOD AND SYSTEM FOR BIDIRECTIONAL DATA TRANSFER

(75) Inventor: Louis Mamakos, Lawrenceville, NJ (US)

(73) Assignee: Vonage Network LLC, Holmdel, NJ (US)

( * ) Notice: Subject to any disclaimer, the term of this patent is extended or adjusted under 35 U.S.C. 154(b) by 345 days.

(21) Appl. No.: 11/709,743

(22) Filed: Feb. 23, 2007

(65) Prior Publication Data

US 2007/0263552 A1 Nov. 15, 2007

Related U.S. Application Data

(60) Provisional application No. 60/776,796, filed on Feb. 27, 2006.

(51) Int. Cl.
*H04L 12/42* (2006.01)
(52) U.S. Cl. .................. 370/449; 709/221; 709/224
(58) Field of Classification Search ............... 370/449, 370/450, 457, 255; 709/221, 222, 224, 225, 709/227, 228
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,777,354 A | 10/1988 | Thomas | |
| 4,782,485 A | 11/1988 | Gollub | |
| 5,018,136 A | 5/1991 | Gollub | |
| 5,425,085 A | 6/1995 | Weinberger et al. | |
| 5,444,707 A | 8/1995 | Cerna et al. | |
| 5,452,289 A | 9/1995 | Sharma et al. | |
| 5,519,769 A | 5/1996 | Weinberger et al. | |
| 5,526,353 A | 6/1996 | Henley et al. | |
| 5,572,576 A | 11/1996 | Klausner et al. | |
| 5,623,490 A | 4/1997 | Richter et al. | |
| 5,638,433 A | 6/1997 | Bubien, Jr. et al. | |
| 5,751,967 A * | 5/1998 | Raab et al. ................ | 709/228 |
| 5,796,951 A * | 8/1998 | Hamner et al. ............. | 709/223 |
| 5,835,126 A | 11/1998 | Lewis | |
| 5,966,427 A | 10/1999 | Shaffer et al. | |
| 5,995,491 A | 11/1999 | Richter et al. | |
| 6,014,437 A | 1/2000 | Acker et al. | |
| 6,029,196 A * | 2/2000 | Lenz ........................ | 709/221 |
| 6,067,516 A | 5/2000 | Levay et al. | |
| 6,084,956 A | 7/2000 | Turner et al. | |
| 6,097,804 A | 8/2000 | Gilbert et al. | |
| 6,104,706 A | 8/2000 | Richter et al. | |
| 6,104,711 A | 8/2000 | Voit | |
| 6,115,460 A | 9/2000 | Crowe et al. | |

(Continued)

OTHER PUBLICATIONS

Srisuresh et al., "Middlebox Communication Architecture and Framework," RFC 3303, Internet Engineering Task Force (Aug. 2002), available at http://www.ietf.org/rfc/rfc3303.txt (last accessed Aug. 27, 2007).

(Continued)

*Primary Examiner*—Chi H. Pham
*Assistant Examiner*—Kevin Mew (57) ABSTRACT

A system and method for managing data transfer between a configurable device and a management system including generating device data, detecting a polling request, transmitting, in a first common communications session and in response to the polling request, at least a portion of the device data and a configuration request, and receiving a configuration file corresponding to the configuration request.

17 Claims, 4 Drawing Sheets

U.S. PATENT DOCUMENTS

| | | | |
|---|---|---|---|
| 6,115,468 A | 9/2000 | De Nicolo | |
| 6,118,860 A | 9/2000 | Hillson et al. | |
| 6,122,364 A | 9/2000 | Petrunka et al. | |
| 6,128,304 A | 10/2000 | Gardell et al. | |
| 6,128,379 A | 10/2000 | Smyk | |
| 6,137,869 A | 10/2000 | Voit et al. | |
| 6,138,072 A | 10/2000 | Nagai | |
| 6,167,042 A | 12/2000 | Garland et al. | |
| 6,169,741 B1 | 1/2001 | LeMaire et al. | |
| 6,175,565 B1 | 1/2001 | McKinnon et al. | |
| 6,178,239 B1 | 1/2001 | Kishinsky et al. | |
| 6,185,285 B1 | 2/2001 | Relyea et al. | |
| 6,188,762 B1 | 2/2001 | Shooster | |
| 6,195,425 B1 | 2/2001 | Farris | |
| 6,195,697 B1 * | 2/2001 | Bowman-Amuah | 709/224 |
| 6,226,286 B1 | 5/2001 | Danne et al. | |
| 6,226,361 B1 | 5/2001 | Koyama | |
| 6,243,443 B1 | 6/2001 | Low et al. | |
| 6,249,576 B1 | 6/2001 | Sassin et al. | |
| 6,266,405 B1 | 7/2001 | Madour et al. | |
| 6,269,398 B1 * | 7/2001 | Leong et al. | 709/224 |
| 6,272,126 B1 | 8/2001 | Strauss et al. | |
| 6,282,281 B1 | 8/2001 | Low | |
| 6,282,284 B1 | 8/2001 | Dzonno et al. | |
| 6,282,574 B1 | 8/2001 | Voit | |
| 6,292,553 B1 | 9/2001 | Fellingham et al. | |
| 6,298,062 B1 | 10/2001 | Gardell et al. | |
| 6,298,064 B1 | 10/2001 | Christie | |
| 6,304,572 B1 | 10/2001 | Christie | |
| 6,304,637 B1 | 10/2001 | Mirashrafi et al. | |
| 6,304,653 B1 | 10/2001 | O'Neal et al. | |
| 6,310,941 B1 | 10/2001 | Crutcher et al. | |
| 6,311,182 B1 | 10/2001 | Colbath et al. | |
| 6,320,951 B1 | 11/2001 | Shtivelman et al. | |
| 6,327,572 B1 | 12/2001 | Motron et al. | |
| 6,330,317 B1 | 12/2001 | Garfinkel | |
| 6,337,899 B1 | 1/2002 | Alcendor et al. | |
| 6,343,115 B1 | 1/2002 | Foladare et al. | |
| 6,349,132 B1 | 2/2002 | Wesemann et al. | |
| 6,351,464 B1 | 2/2002 | Galvin et al. | |
| 6,351,526 B1 | 2/2002 | Shaffer et al. | |
| 6,359,880 B1 | 3/2002 | Curry et al. | |
| 6,363,421 B2 * | 3/2002 | Barker et al. | 709/223 |
| 6,366,577 B1 | 4/2002 | Donovan | |
| 6,366,661 B1 | 4/2002 | Devillier et al. | |
| 6,373,836 B1 | 4/2002 | Deryugin et al. | |
| 6,373,936 B1 | 4/2002 | Raniere et al. | |
| 6,373,938 B1 | 4/2002 | Palacious et al. | |
| 6,385,209 B1 | 5/2002 | Skirmont et al. | |
| 6,389,119 B1 | 5/2002 | McBride | |
| 6,393,115 B1 | 5/2002 | Krauss et al. | |
| 6,393,476 B1 | 5/2002 | Barnhouse et al. | |
| 6,400,820 B1 | 6/2002 | Edwards et al. | |
| 6,404,746 B1 | 6/2002 | Cave et al. | |
| 6,404,882 B2 | 6/2002 | Fellner et al. | |
| 6,404,884 B1 | 6/2002 | Marwell et al. | |
| 6,408,062 B1 | 6/2002 | Cave | |
| 6,408,065 B1 | 6/2002 | O'Neal et al. | |
| 6,411,697 B1 | 6/2002 | Creamer et al. | |
| 6,411,704 B1 | 6/2002 | Pelletier et al. | |
| 6,415,269 B1 | 7/2002 | Dinwoodie | |
| 6,421,437 B1 | 7/2002 | Slutsman | |
| 6,424,707 B1 | 7/2002 | Chatterjee | |
| 6,430,175 B1 | 8/2002 | Echols et al. | |
| 6,430,176 B1 | 8/2002 | Christie, IV | |
| 6,430,275 B1 | 8/2002 | Voit et al. | |
| 6,430,289 B1 | 8/2002 | Liffick | |
| 6,434,143 B1 | 8/2002 | Donovan | |
| 6,442,242 B1 | 8/2002 | McAllister et al. | |
| 6,446,127 B1 | 9/2002 | Schuster et al. | |
| 6,452,932 B1 | 9/2002 | Christie | |
| 6,456,618 B2 | 9/2002 | Kozdon et al. | |
| 6,463,052 B1 | 10/2002 | Christie | |
| 6,466,570 B1 | 10/2002 | Low et al. | |
| 6,470,010 B1 | 10/2002 | Szviatovszki et al. | |
| 6,473,429 B1 | 10/2002 | Christie | |
| 6,480,484 B2 | 11/2002 | Morton | |
| 6,480,581 B1 | 11/2002 | Wu et al. | |
| 6,487,200 B1 | 11/2002 | Fraser | |
| 6,493,337 B1 | 12/2002 | Stevenson, III | |
| 6,493,437 B1 | 12/2002 | Olshansky | |
| 6,496,477 B1 | 12/2002 | Perkins et al. | |
| 6,504,921 B2 | 1/2003 | Kotik et al. | |
| 6,510,219 B1 | 1/2003 | Wellard et al. | |
| 6,519,232 B1 | 2/2003 | Becher | |
| 6,519,333 B1 | 2/2003 | Malik | |
| 6,539,077 B1 | 3/2003 | Ranalli et al. | |
| 6,542,589 B1 | 4/2003 | Baskin | |
| 6,553,023 B1 | 4/2003 | Yamamiya et al. | |
| 6,564,261 B1 | 5/2003 | Gudjonsson et al. | |
| 6,567,398 B1 | 5/2003 | Aravamudan et al. | |
| 6,567,419 B1 | 5/2003 | Yarlagadda | |
| 6,571,212 B1 | 5/2003 | Dent | |
| 6,577,712 B2 | 6/2003 | Larsson et al. | |
| 6,584,094 B2 | 6/2003 | Maroulis et al. | |
| 6,584,098 B1 | 6/2003 | Dutnall | |
| 6,584,186 B1 | 6/2003 | Aravamudan et al. | |
| 6,584,510 B2 | 6/2003 | Anttila | |
| 6,587,836 B1 | 7/2003 | Ahlberg et al. | |
| 6,597,685 B2 | 7/2003 | Miloslavsky et al. | |
| 6,614,786 B1 | 9/2003 | Byers | |
| 6,614,899 B1 | 9/2003 | Sollee et al. | |
| 6,621,899 B2 | 9/2003 | Dezonno et al. | |
| 6,628,760 B2 | 9/2003 | Mirashrafi et al. | |
| 6,633,561 B2 | 10/2003 | Christie | |
| 6,650,890 B1 | 11/2003 | Irlam et al. | |
| 6,664,978 B1 * | 12/2003 | Kekic et al. | 709/224 |
| 6,665,294 B2 | 12/2003 | Christie | |
| 6,665,389 B1 | 12/2003 | Haste, III | |
| 6,665,392 B1 | 12/2003 | Wellner et al. | |
| 6,668,055 B2 | 12/2003 | Marwell et al. | |
| 6,681,252 B1 | 1/2004 | Schuster et al. | |
| 6,690,780 B2 | 2/2004 | Kotik et al. | |
| 6,694,007 B2 | 2/2004 | Lang et al. | |
| 6,697,475 B1 | 2/2004 | MeLampy et al. | |
| 6,707,811 B2 | 3/2004 | Greenberg et al. | |
| 6,707,906 B1 | 3/2004 | Ben-Chanoch | |
| 6,711,160 B2 | 3/2004 | Chan et al. | |
| 6,714,988 B1 | 3/2004 | Takemoto et al. | |
| 6,718,031 B2 | 4/2004 | Fellner et al. | |
| 6,724,755 B1 | 4/2004 | Kim | |
| 6,731,630 B1 | 5/2004 | Schuster et al. | |
| 6,731,642 B1 | 5/2004 | Borella et al. | |
| 6,731,741 B1 | 5/2004 | Fourcand et al. | |
| 6,741,586 B1 | 5/2004 | Schuster et al. | |
| 6,748,057 B2 | 6/2004 | Ranalli et al. | |
| 6,760,429 B1 | 7/2004 | Hung et al. | |
| 6,763,226 B1 | 7/2004 | McZeal, Jr. | |
| 6,765,931 B1 | 7/2004 | Rabenko et al. | |
| 6,769,020 B2 | 7/2004 | Miyazaki et al. | |
| 6,771,637 B1 | 8/2004 | Suzuki et al. | |
| 6,775,368 B1 | 8/2004 | Lee et al. | |
| 6,778,661 B1 | 8/2004 | Yumoto et al. | |
| 6,798,873 B2 | 9/2004 | Vardi et al. | |
| 6,819,752 B2 | 11/2004 | Raniere et al. | |
| 6,822,945 B2 | 11/2004 | Petrovykh | |
| 6,839,359 B2 | 1/2005 | Skirmont et al. | |
| 6,839,421 B2 | 1/2005 | Esparza et al. | |
| 6,922,722 B1 | 7/2005 | Mann et al. | |
| 7,024,476 B1 * | 4/2006 | Page et al. | 709/224 |
| 7,181,519 B2 * | 2/2007 | Pillai et al. | 709/224 |
| 7,246,159 B2 * | 7/2007 | Aggarwal et al. | 709/220 |
| 7,308,487 B1 * | 12/2007 | Dansie et al. | 709/219 |
| 7,334,001 B2 * | 2/2008 | Eichstaedt et al. | 707/104.1 |

| | | | |
|---|---|---|---|
| 7,421,495 B2 * | 9/2008 | Yang et al. ................... 709/223 |
| 7,480,705 B2 * | 1/2009 | DeLima et al. ............. 709/222 |
| 2001/0005412 A1 | 6/2001 | Light et al. |
| 2001/0005415 A1 | 6/2001 | Grunsted et al. |
| 2001/0014919 A1 | 8/2001 | Tzirin |
| 2002/0007391 A1 | 1/2002 | Suzuki |
| 2002/0049815 A1 | 4/2002 | Dattatri |
| 2002/0049860 A1 | 4/2002 | Koitinen |
| 2002/0055879 A1 | 5/2002 | Wengrovitz et al. |
| 2002/0095516 A1 | 7/2002 | Nada |
| 2002/0112073 A1 | 8/2002 | McLampy et al. |
| 2002/0114430 A1 | 8/2002 | Murata |
| 2002/0126818 A1 | 9/2002 | Cai et al. |
| 2002/0129131 A1 | 9/2002 | Yamashita |
| 2002/0150083 A1 | 10/2002 | Fangman et al. |
| 2002/0156900 A1 * | 10/2002 | Marquette et al. ........... 709/227 |
| 2002/0191635 A1 | 12/2002 | Chow et al. |
| 2003/0005280 A1 | 1/2003 | Bobde et al. |
| 2003/0041132 A1 | 2/2003 | Lim et al. |
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0163526 A1 | 8/2003 | Clarisse et al. |
| 2003/0174695 A1 | 9/2003 | Lautenschlager et al. |
| 2003/0202504 A1 | 10/2003 | Dhara et al. |
| 2004/0028025 A1 | 2/2004 | Chang |
| 2004/0028207 A1 | 2/2004 | Kato |
| 2004/0039938 A1 | 2/2004 | Katz et al. |
| 2004/0057415 A1 | 3/2004 | Colson et al. |
| 2004/0114575 A1 | 6/2004 | Morita et al. |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018659 A1 | 1/2005 | Gallant et al. |
| 2006/0136582 A1 * | 6/2006 | Mills .......................... 709/224 |
| 2006/0253567 A1 * | 11/2006 | Selin et al. ................... 709/224 |
| 2009/0113037 A1 * | 4/2009 | Pouchak ..................... 709/224 |

OTHER PUBLICATIONS

Rosenberg et al., "NAT Friendly SIP," Internet Engineering Task Force (Jul. 20, 2001), available at http://tools.ietf.org/html/draft-rosenberg-sip-entfw-02 (last accessed Aug. 27, 2007).

* cited by examiner

METHOD AND SYSTEM FOR BIDIRECTIONAL DATA TRANSFER

The disclosure claims the filing-date benefit of Provisional Application No. 60/776,796, filed Feb. 27, 2006, the specification of which is incorporated herein in its entirety.

FIELD OF THE INVENTION

The present disclosure relates generally to systems and methods for sending and receiving data among a set of devices on a network. Selected embodiments relate generally to sending and receiving data among configurable devices and maintenance systems for a Voice-over-IP (VoIP) network.

BACKGROUND

Conventionally, systems for transmitting voice signals over the Internet commonly include a configurable device for converting analog voice signals into digital signals and transmitting the digital signals. Generally, these devices are connected to a conventional telephone or integrated with the phone to provide a customer with traditional and familiar telephone functionality.

As digital voice networks such as VoIP became more complex, the deployed devices were complemented with management systems to maintain and control aspects of device functions. These management systems sometimes configure the devices to control their operation and allow the customer access to certain configuration parameters related to services. To ensure proper operation of the device, the device preferably operates using the most current configuration. These configurations are often profile-based, where these profiles include parameters controlling various aspects of the device's features, performance, and overall behavior.

Figure 1:
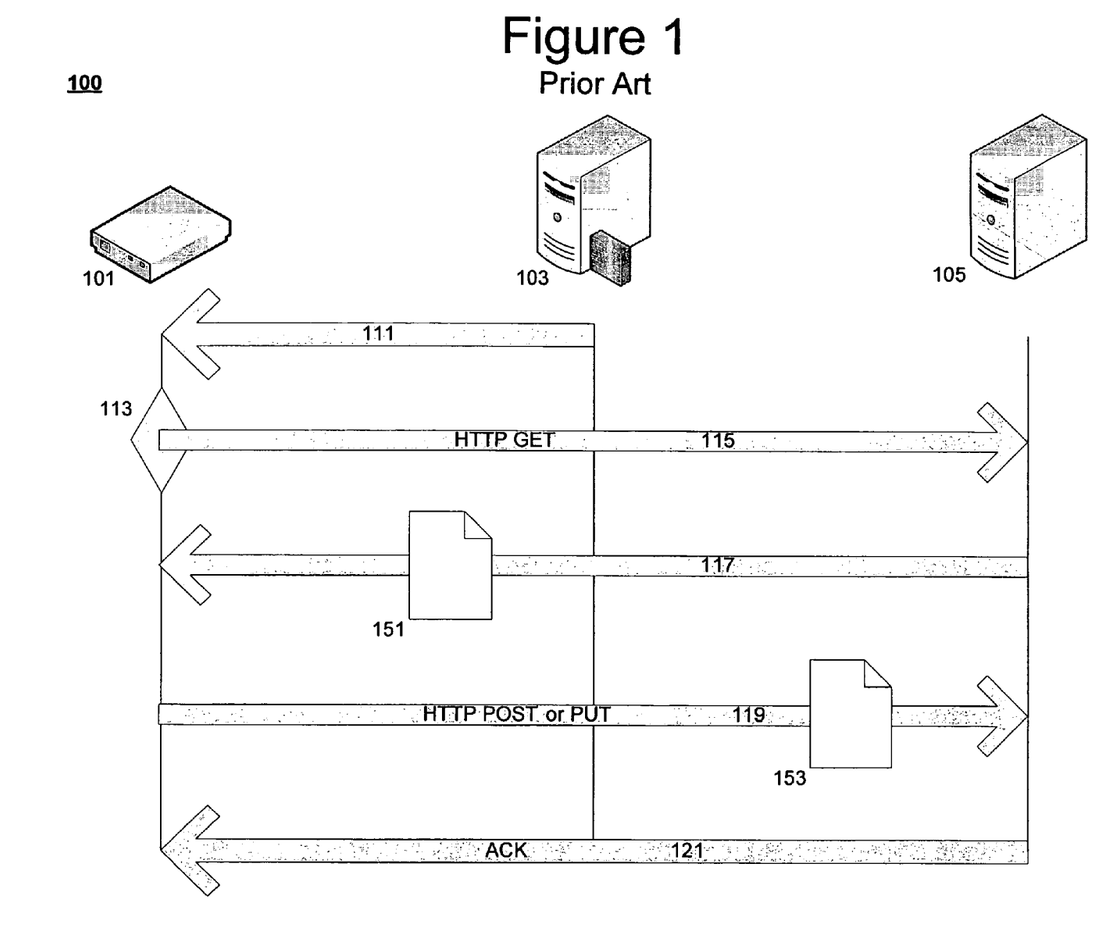
FIG. 1 illustrates a prior art system and method for transferring data between a configurable device and a management system.

FIG. 1 illustrates the operation of a prior art system 100 and method for transferring data between a configurable device 101 and a management system 105. In response to some external event or change, a SIP Proxy server 103 sends a SIP NOTIFY message as a polling request 111 over a network to the configurable device 101. Alternately, a polling request takes the form of a timer event 113. The timer event is generated locally at the configurable device 101 or a remote timer. Upon receiving a polling request, the device 101 polls the management system 105 by sending an HTTP GET request 115 to the management system 105. This request checks for and attempts to receive the most current configuration file for the configurable device 101. Alternatively, the device 101 can wait for a predetermined number of polling requests or detect a particular message within the polling request that triggers it to poll the management system 105. Upon receiving the HTTP GET or similar message, the management system 105 responds by transferring a new configuration file 151 to the device 101, if available, in the HTTP protocol response 117. Communications among the configurable device 101, the SIP proxy server 103, and the management system 105 generally occur over the Internet or other available network connecting the communicating entities.

Occasionally, the configurable device 101 transfers files 153 to the management system 105 using an HTTP POST or PUT operation 119. The files in the HTTP POST or PUT operation 119 include a variety of file types generated by the device such as device log information. Upon receipt of the files 153, the management system 105 sends an acknowledgement message 121 to the configurable device 101 confirming that the files were received, thereby concluding the HTTP POST/PUT operation.

The conventional systems and methods of data transfer among devices 101 and the management system 105 have the disadvantage of requiring many separate communications sessions to be established among the communicating entities. These numerous sessions consume bandwidth and hardware resources. To effectively scale their VoIP and data networks, network operators and service providers are faced with the challenge of maintaining the performance and function of the various remotely deployed devices with a manageable and minimal investment in shared infrastructure.

Accordingly, there is a need in industry for technological solutions providing a more efficient system and method for transferring data between a configurable device and a management system.

SUMMARY

Various disclosed embodiments are generally directed to a system and method for managing data transfer between a configurable device and a management system including generating device data, detecting a polling request, transmitting, in a first common communications session and in response to the polling request, at least a portion of the device data and a configuration request, and receiving a configuration file corresponding to the configuration request.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

One aspect of the present disclosure includes grouping data transmissions within common communications sessions. Another aspect includes prioritizing data collected at a remote configurable device for grouped or individual transmission. Yet another aspect includes selecting a configuration file to update a remote configurable device based on the device condition reflected by collected device data.

Various disclosed embodiments advantageously provide more efficient systems and methods for transferring data between a configurable device and a management system. In particular, selected embodiments reduce the required number of communications sessions required among networked entities.

Figure 2:
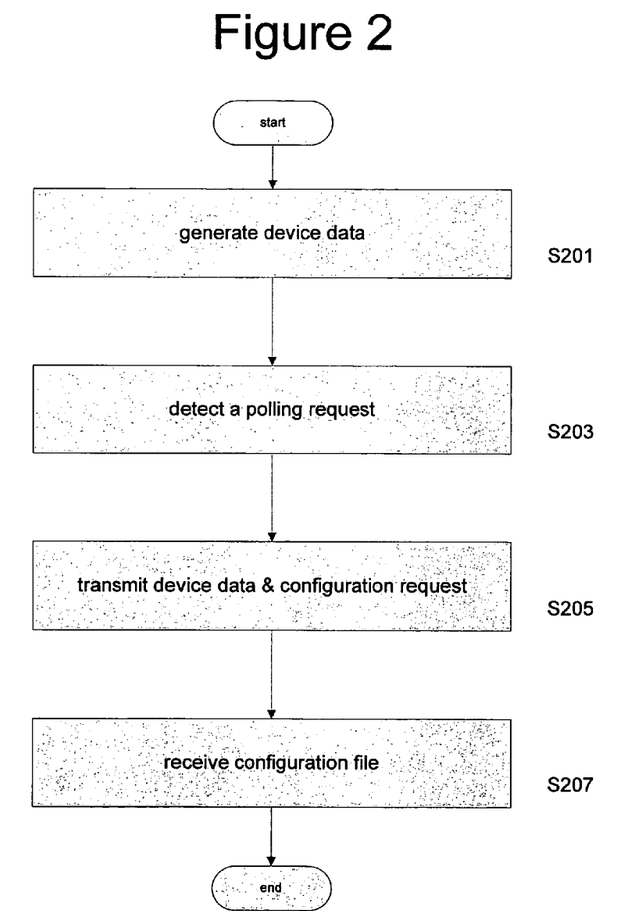
FIG. 2 is a flow chart outlining an exemplary disclosed method.

FIG. 2 illustrates a flow-chart outlining an exemplary disclosed method. The method includes generating device data S201, detecting a polling request S203, transmitting, in a common communications session and in response to the polling request, at least a portion of the device data and a configuration request S205, and receiving a configuration file corresponding to the configuration request S207. Device data is preferably generated by a remote configurable device operably connected over a network to a management system. The device data is preferably stored locally with the remote configurable device. However, as discussed elsewhere, a portion of the device data is preferably stored for periodic delivery while another portion is transmitted upon being generated.

Device data includes, but is not limited to, a device status entry, a device error entry, a communications error entry, a device performance entry, and a communications performance entry. For example, a device status entry indicates an operating condition of the device such as "operational," "malfunctioning," or "busy," and optionally indicates a configuration profile version currently being used by the device. In another example, a device error entry indicates a type of error related to the device itself such as a malfunctioning component or software module. In yet another example, a communications error entry indicates problems with the device's network connection such as low bandwidth or disconnections. In an additional example, a device performance entry indicates measurements of the device's functions such as operation times or durations, digital-to-analog or analog-to-digital conversion metrics, sampling rates, and dropped frames or packets. In a further example, a communications performance entry indicates measurements of the device's communications functions such as data transfer rates, latency, or signal noise.

Device data is preferably prioritized to identify at least low priority items. Low priority items include, but are not limited to, data entries which do not reflect immediate or impending malfunction or serious problems with either the device or network performance. Low priority items are preferably stored and transmitted with the configuration request after a polling request is detected. In alternative embodiments, all device data, including high priority or critical device data, is stored and transmitted with the configuration request upon detection of a polling request.

A polling request includes, but is not limited to, a SIP NOTIFY message from a SIP proxy server. Alternatively, the polling request is received from the management system. In another alternative, the polling request is generated locally. For instance, the device optionally counts external polling requests and commences transmission after a predetermined number of polling requests. Alternatively, the device transmits intermittently or periodically based on an internal timer. Optionally, the independent local timer operates in conjunction with externally received requests. Accordingly, the device updates according to a regular schedule and in accordance with external polling requests generated, for instance, when a service provider seeks to implement a network-wide change in response to network performance or network security conditions.

A configuration request includes, but is not limited to, a request for the most recent configuration file. Alternatively, for instance when the remote configurable device is attempting to recover after a critical failure, the request may be for an original configuration file or a patch corresponding to a detected critical failure.

A configuration file includes, but is not limited to, a firmware update, a software patch, or updated feature parameter values altering the behavior or capabilities of the configurable device.

The configuration file request and the device data, either alone or in combination, are used by the management system to select a configuration file for transmission to the configurable device. Further, the management system optionally also analyzes data previously transmitted by the device (for instance, high priority or critical device data items transmitted upon generation) in view of the device data received with the configuration request. Analyzing these data types from the device enables the management system to ascertain whether the configurable device requires a major or minor update to its configuration. For example, the configurable device, if corrupted, may request the wrong version of the configuration file and exhibit low or unsatisfactory performance. If major errors or issues are determined from critical data previously transmitted, then the management system optionally selects and transmits a configuration file different from that requested in view of its analysis of the device data. Further, additional files such as a complete firmware upgrade or user guidance document are optionally transmitted based on detected issues with the configurable device.

Figure 3:
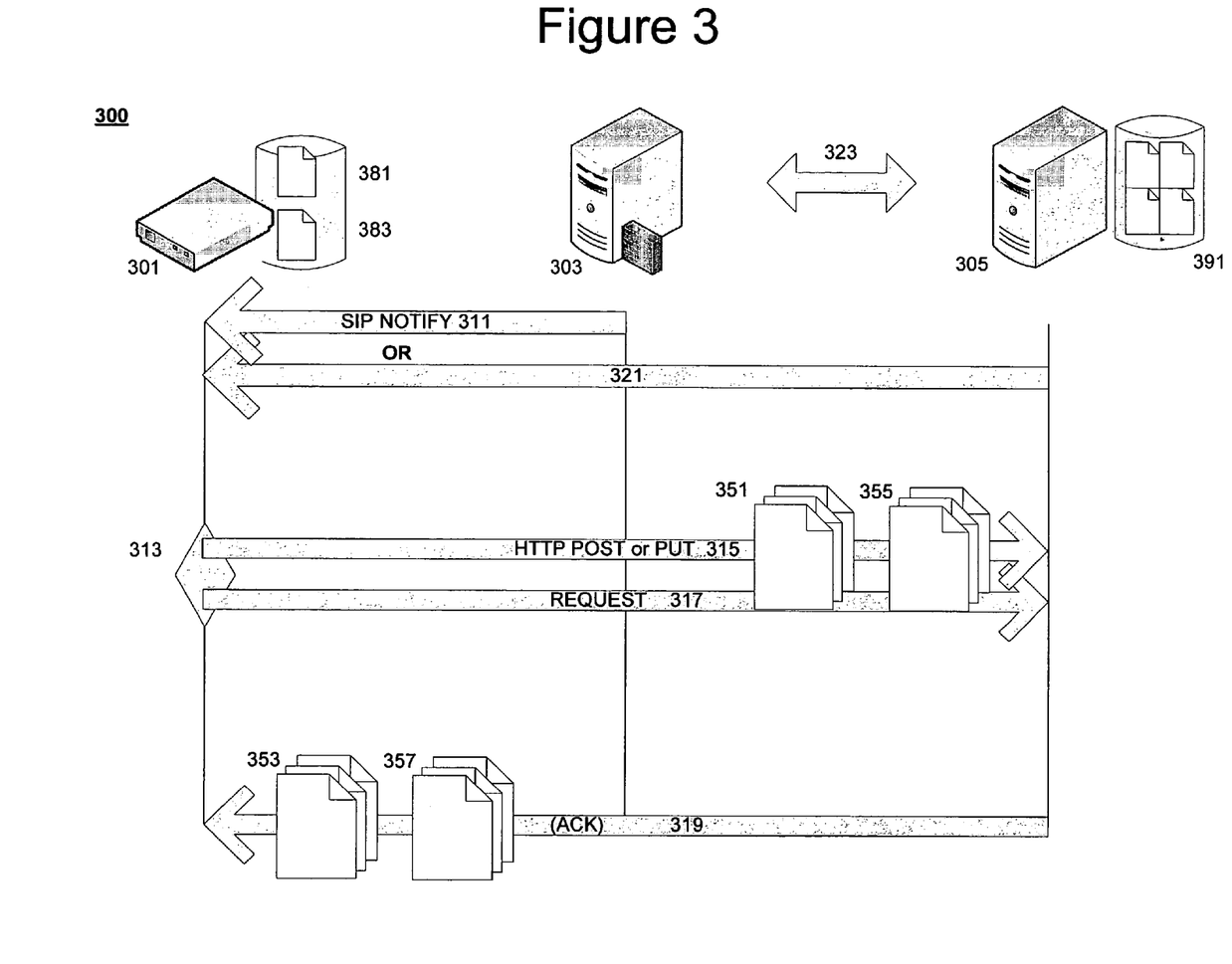
FIG. 3 is a schematic illustration of an exemplary embodiment for transferring data between a configurable device and a management system.

FIG. 3 is a schematic illustration of an exemplary embodiment for transferring data between an improved configurable device 301 and an improved management system 305.

The configurable device 301 generates device data including, but not limited to, one of a device status entry, device error entry, communications error entry, device performance entry, and communications performance entry as disclosed elsewhere. Optionally, the device data is stored and prioritized to identify low priority items 381 and higher priority or critical items 383.

The polling request is received at the configurable device 301. Preferably, a SIP Proxy server 303 sends a polling request as a SIP NOTIFY message 311 over a network to the configurable device 301. The polling request is optionally a timer event 313 from a source local to the configurable device 301. Alternatively, the polling request 321 is optionally received from the management system 305. In certain architectures (for instance, if the configurable device 301 is located behind a Network Address Translation (NAT) router or firewall) the management system 305 and the SIP proxy 303 communicate 323 to enable the management system 305 to ascertain the network identity or location of the configurable device 301.

Upon detecting the polling request 311/313, the device 301 responds by transmitting device data and a configuration request. In a first common communications session, the device 301 preferably responds by sending an HTTP POST or PUT message 315 including files 351 to the management system 305 along with a request 317 for the most current configuration file. The files 351 sent with the HTTP POST or PUT message 315 include, but are not limited to, device data as disclosed elsewhere. These files or analysis thereof update the management system 305 as to the status of the device 301. Further, the files optionally assist in identifying problems (present or potential) with the device 301 or communications to and from the device 301. Supplemental files 355 are also optionally transmitted to the management system 305 during this communications session. In one embodiment, the data transmitted during this operation includes diagnostic and debugging data, such as debugging messages that would otherwise be stored in a log file, or transmitted a line at a time using a network protocol such as "syslog". Additionally, the data can include performance related data related to the application or function that the device performs. For example, for a VoIP device, it might include voice quality information that was passively measured over some recent calls that were placed. The data can additionally include other "active" measurements performed alongside the primary function, such as measuring network connectivity, probing the path that traffic takes over the network as part of the application and communicating that back to the management system. In alternative embodiments, alternative protocols are employed to transfer data including, but not limited to, File Transfer Protocol (FTP), SSH FTP (SFTP), FTP over SSL (FTPS), or Trivial FTP (TFTP).

After the files 351 are sent to the management system 305, the management system sends a new configuration file 353, if necessary, back to the device. The new configuration file 353 is selected by the management system 305 in accordance with an analyzed device condition. Various approaches to ascertaining or estimating device condition are described elsewhere.

The management system 305 optionally maintains records in a database 391 corresponding to the status of the device 301 to assist in the selection of the appropriate configuration file 353. These records optionally correspond to the historical or present status or condition of the device 301 as reflected in the device data transmitted by the device 301. Further, the database 391 also optionally contains a plurality of configuration files corresponding to various types of devices 301 and device conditions/statuses. The database 391 is implemented in any number of separate or integrated storage entities as is known in the art.

The transfer of the configuration file 353 in this communications session advantageously obviates the need for a separate and distinct TCP connection or other transaction between configurable device 301 and management system 305. This coupled transfer also avoids the associated overhead and delay of establishing an additional communications session. Conveyance of the configuration file 353 also serves as a positive acknowledgement 319 that files 351 (for example, device data) were received.

In another embodiment, in response to the receipt of the files 351 conveyed preferably with an HTTP POST or PUT operation, the management system 305 sends another type of file 357 along with the configuration file 353 back to the device 301 in a second common communications session. This complementary file 357 includes, but is not limited to, a firmware patch, an updated troubleshooting guide or software, or an advertisement. Accordingly, by grouping occasionally generated data with configuration requests and data that are routinely transferred, a more efficient management of the transfer of data between a configurable device and a management system is achieved.

Figure 4:
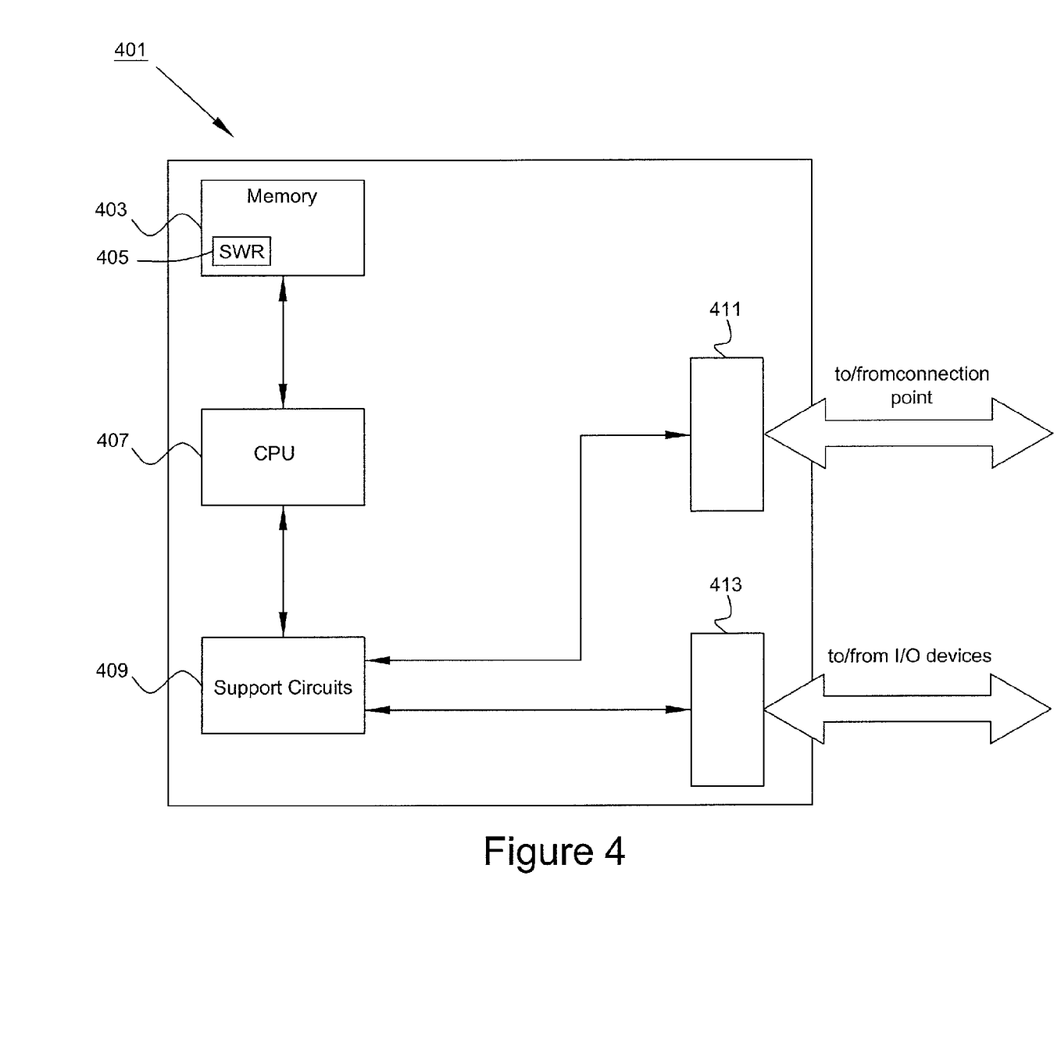
FIG. 4 is a schematic illustration of an exemplary configurable device.

FIG. 4 is a schematic illustration of an exemplary configurable device 401. The device 401 may be used to facilitate the data transfer approaches described above. The device 401 may be one of any form of a general purpose computer processor used in accessing an IP-based network such as a corporate intranet, the Internet or the like. The device 401 comprises a central processing unit (CPU) 407, a memory 403, and support circuits 409 for the CPU 407. The device 401 also includes provisions 411/413 for connecting the device 401 to the customer equipment (not shown) and service provider agent equipment and the one or more input/output devices (not shown) for accessing the device 401 and/or performing ancillary or administrative functions related thereto. Note that the provisions 411/413 are shown as separate bus structures in FIG. 4; however, they may alternately be a single bus structure without degrading or otherwise changing the intended operability of the device 401 or invention in general. Additionally, the device 401 and its operating components and programming as described in detail below are shown as a single entity; however, the device may also be one or more devices and programming modules interspersed around the system each carrying out a specific or dedicated portion of the diagnostic analysis as described earlier. The device 401 optionally includes or communicates with a display for communicating visual information to a customer. By way of non-limiting example, a portion of the device 401 or software operations may occur at a service provider network entity such as the SIP proxy server 303 or management system 305 and another portion of the device 401 or software operations may occur at the service provider agent equipment. Other configurations of the device and device programming are known and understood by those skilled in the art.

The memory 403 is coupled to the CPU 407. The memory 403, or computer-readable medium, may be one or more of readily available memory such as random access memory (RAM), read only memory (ROM), floppy disk, hard disk, flash memory or any other form of digital storage, local or remote. The support circuits 409 are coupled to the CPU 407 for supporting the processor in a conventional manner. These circuits include cache, power supplies, clock circuits, input/output circuitry and subsystems, and the like. A software routine 405, when executed by the CPU 407, causes the device 401 to perform processes of the present invention and is generally stored in the memory 403. The software routine 405 may also be stored and/or executed by a second CPU (not shown) that is remotely located from the hardware being controlled by the CPU 407.

The software routine 405 is executed when a preferred method of managing data transfer between the configurable device 401 and a management system 305 is desired. The software routine 405, when executed by the CPU 407, transforms the general purpose computer into a specific purpose computer (device) 401 that controls the web-based application, suite of diagnostic tools or other similar actions. Although the process of the present invention is discussed as being implemented as a software routine, some of the method steps that are disclosed therein may be performed in hardware as well as by the software device. As such, the invention may be implemented in software as executed upon a computer system, in hardware as an application specific integrated circuit or other type of hardware implementation, or a combination of software and hardware. The software routine 405 of the present invention is capable of being executed on computer operating systems including but not limited to Microsoft Windows 98, Microsoft Windows 2000/XP/Vista, FreeBSD, NetBSD, Apple OS X and Linux. Similarly, the software routine 405 of the present invention is capable of being performed using CPU architectures including but not limited to IBM Power PC, Intel x86, Sun SPARC, AMD, Transmeta, MIPS, and ARM.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

The embodiments disclosed herein for managing data transfer can be implemented using computer usable medium having a computer readable code executed by special purpose or general purpose computers.

What is claimed is:

1. A method for managing data transfer between a configurable device and a management system, comprising:
   in a processor, generating device data;
   storing the device data;
   detecting a polling request;
   prioritizing the device data to identify low priority items therein;

transmitting, in a first common communications session and in response to the polling request, at least a portion of the device data and a configuration request; and receiving a configuration file corresponding to the polling response request wherein the step of transmitting includes transmitting the low priority items with the configuration request.

2. The method of claim 1, further comprising:
updating a device status according to the at least a portion of the device data to determine a device condition; and
selecting the configuration file based on the device condition.

3. The method of claim 1, further comprising:
receiving a complementary file with the configuration file in a second common communications session.

4. The method of claim 1, wherein the polling request is a SIP NOTIFY signal.

5. The method of claim 1, wherein the device data includes at least one of a device status entry, device error entry, communications error entry, device performance entry, and communications performance entry.

6. The method of claim 1, wherein the configuration request includes a request for a most recent configuration file.

7. The method of claim 1, wherein the polling request is received from at least one of a SIP proxy server, the management system, and an internal timer.

8. A computer program product for use with a device on a communications network, comprising:
a non-transitory computer usable medium having computer readable program code modules embodied in said medium for managing data transfer between a configurable device and a management system;
a computer readable first program code module for causing a computer to generate device data;
a computer readable second program code module for causing a computer to detect a polling request;
a computer readable third program code module for causing a computer to transmit, in a first common communications session and in response to the polling request, at least a portion of the device data and a configuration request;
a computer readable fourth program code module for causing a computer to receive a configuration file corresponding to the configuration request;
a computer readable fifth program code module for causing a computer to store the device data; and
a computer readable sixth program code module for causing a computer to prioritize the device data to identify low priority items therein, wherein the step of transmitting includes transmitting the low priority items with the configuration request.

9. The computer program product of claim 8, further comprising:
a computer readable seventh program code module for causing a computer to update a device status according to the at least a portion of the device data to determine a device condition; and
a computer readable eighth program code module for causing a computer to select the configuration file based on the device condition.

10. The computer program product of claim 8, further comprising:
a computer readable seventh program code module for causing a computer to receive a complementary file with the configuration file in a second common communications session.

11. The computer program product of claim 8, wherein the polling request is a SIP NOTIFY signal.

12. The computer program product of claim 8, wherein the device data includes at least one of a device status entry, device error entry, communications error entry, device performance entry, and communications performance entry.

13. The computer program product of claim 8, wherein the configuration request includes a request for a most recent configuration file.

14. The computer program product of claim 8, wherein the polling request is received from at least one of a SIP proxy server, the management system, and an internal timer.

15. An apparatus for managing data transfer among a plurality of entities in communication over a data network, comprising:
a terminal adapter device configured to generate device data, prioritize device data to identify low priority items therein, detect a polling request, transmit the low priority items and a configuration request over the data network in a first common communications session; and
a management system configured to receive the low priority items and the configuration request from the terminal adapter device, select a new configuration file from a plurality of configuration files, and transmit the new configuration file to the terminal adapter.

16. The apparatus of claim 15, wherein the management system is further configured to update a device status according to the low priority items, and to select the configuration file based on the device condition.

17. The apparatus of claim 15, wherein the management system is further configured to transmit a complementary file with the configuration file in a second common communications session.

* * * * *